Sept. 18, 1934.  J. KOLLMAN  1,974,186
INSULATED PAN SET
Filed April 29, 1931

Witness:
William P. Kilroy

Inventor
Jacob Kollman
By Charles S. Melson
Atty.

Patented Sept. 18, 1934

1,974,186

UNITED STATES PATENT OFFICE 1,974,186

INSULATED PAN SET

Jacob Kollman, Chicago, Ill., assignor to Edward Katzinger Company, Chicago, Ill., a corporation of Illinois Application April 29, 1931, Serial No. 533,593

7 Claims. (Cl. 53—6)

This invention relates to baking pan sets generally, and more particularly to sets for baking cake slabs, and the like, wherein it is desirable to prevent the formation of a crust on the sides and edges of the cake baked therein.

It is an object of this invention to provide a plurality of spaced baking pans in rigid assembly having heat insulating material disposed adjoining the pan walls and between the contiguous walls of adjoining pans, conforming to and substantially filling the space between such pans, and so attached to the pan walls as to eliminate the use of rivets or similar fastening means piercing the adjacent pan walls.

With the above and other objects in view, as will be apparent, this invention consists in the construction, combination and arrangement of parts, all as hereinafter more fully described, claimed and illustrated in the accompanying drawing, wherein:

Figure 1:
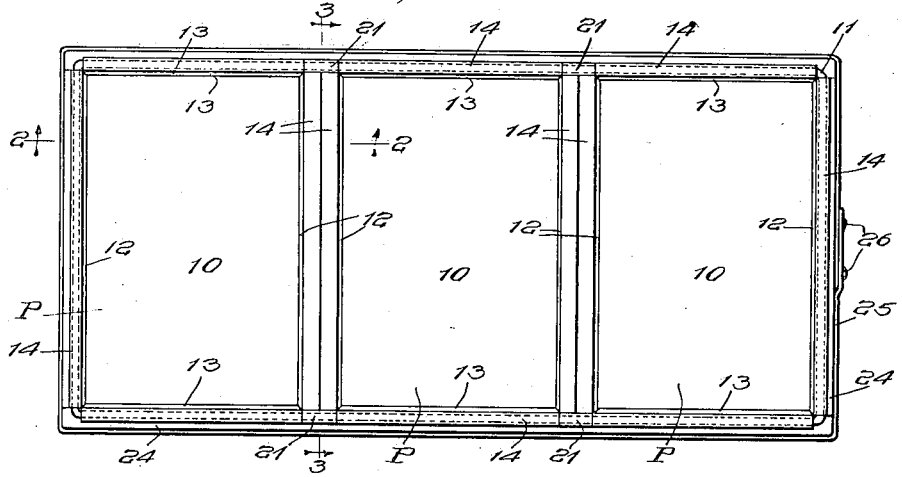
Fig. 1 is a plan view of a pan set constructed in accordance with the present invention.
Figure 2:
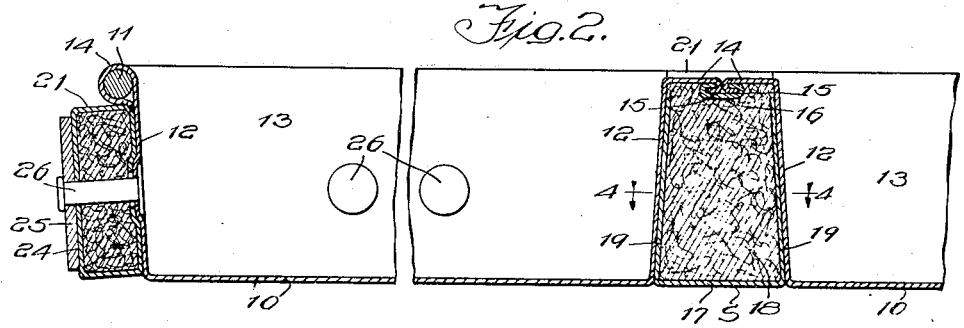
Fig. 2 is a longitudinal vertical section taken along line 2—2 of Fig. 1 to show the mounting of insulating members between the pans of the set and those coacting with the outer walls.
Figure 3:
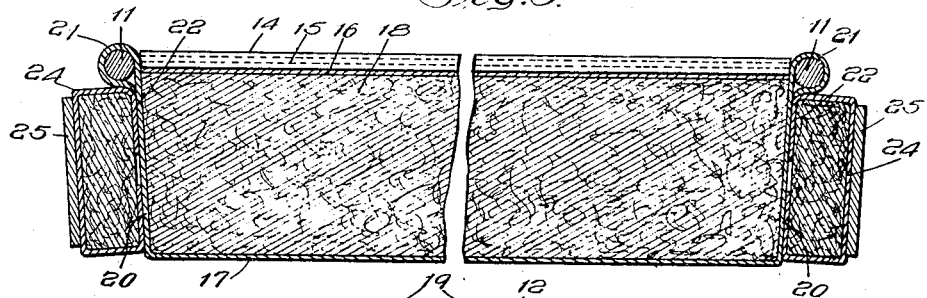
Fig. 3 is a longitudinal vertical section taken along line 3—3 of Fig. 1 transversely of the set.
Figure 4:
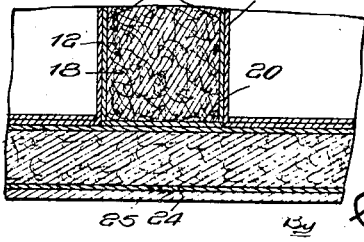
Fig. 4 is a horizontal fragmentary section taken on line 4—4 of Fig. 2.

This invention contemplates the uniting of a number of pans in a set with heat insulating members coacting with exposed walls of each pan and the complete filling of the spaces between individual pans with insulating material in such manner that the same is securely held in place and protected, and crevices, cavities and spaces are substantially eliminated.

The present invention also has in view the elimination of fastening means piercing the contiguous pan walls in securing the insulating material in the spaces between adjoining pans of the set, at the same time increasing the security and strength of the set and providing an intimate cooperation between the pan walls and the insulating material.

Furthermore, the present construction provides means for so securing the individual pans into a set that distortion, twisting of the set and displacement of the pans thereof is reduced to a minimum.

Reference being had more particularly to the drawing, P represents a baking pan constructed in accordance with the present invention, including a bottom 10, having side walls 12 and end walls 13 extending upwardly from bottom thereof. At their upper edges the side walls 12 and end walls 13 terminate in flanges 14. While the drawing illustrates a unitary assembly of three baking pans P bound or secured together in aligned and spaced relation, it will be apparent that a greater or less number of pans may be included in the set if desired.

A wire 11 encircles all of the pans P of the set as shown in Fig. 1 and is secured to the exposed walls 12—13 of the pans P by the flanges 14, which are bent to embrace the wire 11 and terminate adjoining the adjacent pan wall, below the wire 11. By this means the upper edge of each exposed wall 12—13 of each pan P is provided with a bead comprising the wire 11 and encircling flange 14 formed from the pan wall. In this manner the intermediate pans P of the set have beads only on the end walls 13 while the end pans P have beads on one side wall 12 and the end walls 13. It is to be observed that, independently of such other means as may be provided the pans P are secured together into a pan set by means of the wire 11 and the engagement thereof by the flanges 14 on the exposed walls 12—13 of the individual pan.

The flanges 14 on the contiguous side walls 12 of the adjacent pans P are bent outwardly to occupy substantially horizontal and coplanar positions and terminate in abutting and inwardly bent portions 15. Cooperating with said creased portions 15 is a tie member 16, the edges of which are rebent upon the body of the number 16 and are inserted in the portions 15 of the flanges 14. The edges of the tie member 16 and the portions 15 of the abutting flanges 14 are then subjected to pressure to create an intimate and fixed connection or seam. Thus the upper side of the space between adjoining pans P is closed by a relatively smooth horizontal wall made up of two abutting connected flanges 14.

A quantity of heat insulating material 18 such as asbestos or other suitable material is placed within and substantially conforms to the contour of the space between the contiguous walls 12 of adjoining pans P, and bears directly against the horizontal connection between those walls formed by the abutting flanges 14 extending at each end, to a point in the plane of the end walls 13 of the pans P. In order to hold this insulating material 18 in position, it is surrounded by a sheath S, having a bottom 17, coplanar with the bottoms 10 of the pans P, and side walls 19 extending upwardly therefrom, resting flush against the adjacent pan walls 12, and terminating slightly below the flanges 14. End walls 20 are provided on this sheath and extend upwardly in a position coplanar with the end walls 13 of the pans P, to terminate in a flange 21 which is bent about the wire 11, in the same manner as the flanges 14 of the corresponding end walls 13 of the pans P. Thus the sheath S consisting of the elements 17, 19 and 20 encloses all of the remaining exposed portions of the insulating material 18, and is firmly retained in its position between the adjoining side walls 12 by the connection with the wire 11 embracing the entire pan set.

The insulating material 18 in the space between two adjoining pans P is consequently held in place by the sheath S and is housed between the bottom 17, side wall 19 and end walls 20 of the sheath S and the coacting abutting connected flanges 14. It is therefore manifest that the spaces between the adjoining pans of the set are completely occupied by the insulating material 18 and the sheath cooperating therewith. It is further evident that this construction provides a strong connection between the insulating material and the pans P without the use of rivets or similar fastening devices which ordinarily pierce the pan walls.

Strips 21 of heat insulating material, are also provided for the corresponding and coplanar end walls 13 and outer side walls 12 of the pans P. To that end a continuous strip of heat insulating material 21 is placed along the alined end walls 13 of the pans P. A metallic covering 24 is applied to this insulating strip 21 which completely covers all exposed surfaces of the material, and is bent inwardly as at 22, to be clamped and engaged between the material 21 and the outer surface of the adjoining pan wall 13. The insulating strip 21, together with its covering 24, are secured to the walls 13 of the pans P by means of rivets 26 which pass through the covering 24, the insulating strip 21, and the pan walls 13. A separate heat insulating strip 21 together with its covering 24, is also applied to the outer side walls 12 of the end pans of the set.

All of the pans P of the pan set, are secured together by a strap 25, which encircles the entire pan set and is also secured to the outer side walls 12 and aligned end walls 13 of the pans P and to the heat insulating member 21 by means of rivets 26 which pass through the strap 25, the covering 24, the insulating member 21 and the adjoining pan wall. In this manner a pan set is obtained wherein the union of the pans is strengthened not only by the wire 11, but by the insulating member 21 and its covering 24 extending in one continuous strip along and throughout the exposed sides of the pan set which assists the strap 25 in preventing lateral movement or distortion of the units of the pan set.

By the present structure it is manifest that all exposed pan walls are provided with coacting insulating members, rigidly and fixedly mounted in intimate contact therewith; that spaces and crevices are reduced to a minimum; that the insulating material is fully covered and protected, and that the pans P are secured together into a set in a manner that provides double security and strength.

What is claimed is:

1. The combination with a pair of spaced pans, of means encircling said pans and secured thereto, a filler for the space between the pans, and means engaging the first said means for securing said filler in position.

2. The combination with a plurality of pans, of binding means comprising a continuous member encircling said pans and secured thereto, an insulating member positioned in and filling the space between contiguous walls of adjoining pans, a holder therefor, and means for retaining said insulating member in position by attaching the holder to said binding means.

3. The combination with a plurality of pans, each having flanges projecting from the upper edges thereof, of means for connecting said pans together to form a pan set comprising a continuous member encircling said pans and engaged by said flanges, a heat insulating member positioned and filling the space between contiguous walls of adjoining pans, a holder for said insulating member and means coacting with said continuous member for retaining said heat insulating member and holder in position.

4. The combination with a plurality of pans, each having flanges projecting from the upper edges thereof, of means for connecting said pans together to form a pan set comprising a continuous member encircling said pans and engaged by said flanges, a heat insulating member positioned and filling the space between contiguous walls of adjoining pans, a holder for said insulating member, and means formed integrally with said holder for retaining said heat insulating member in position by cooperation with the continuous member aforesaid.

5. The combination with a plurality of pans, each having flanges projecting from the upper edges thereof, of means engaged by said flanges for connecting said pans together to form a pan set comprising a continuous member encircling said pans and having exposed portions corresponding to the spaces between contiguous walls of adjoining pans, a heat insulating member positioned in and filling the space between contiguous walls of adjoining pans, a holder for said heat insulating member, and means formed integrally with said holder and engaging with the exposed portions of said continuous member for retaining said heat insulating member in position.

6. The combination with a plurality of pans, each having flanges projecting from the upper edges thereof, of means engaged by said flanges for connecting said pans together to form a pan set comprising a continuous member encircling said pans and having exposed portions corresponding to the spaces between contiguous walls of adjoining pans, a heat insulating member positioned in and filling the space between contiguous walls of adjoining pans, a holder for said heat insulating member, and flanges on said holder formed integrally therewith and engaging the exposed portions of said continuous member for retaining said heat insulating member in position.

7. The combination with a plurality of pans spaced one from the other, of horizontal flanges on the contiguous walls of adjacent pans fixed together at their abutting edges thereby closing one side of each space between the pans, of insulating material completely filling said spaces, a covering for said insulating material comprising a base closing the side of the space between the pans opposed to said flanges, side walls on said base extending into the spaces between said pans and resting flush against the adjoining walls of the said pans, end walls on said base, and a frame surrounding all of the pans of the set and engaged by the end walls aforesaid.

JACOB KOLLMAN.